Nov. 23, 1926.

C. ENGEL 1,608,378

COMBINED SLED AND WAGON

Filed Jan. 2, 1926

WITNESSES
E. A. Wilson
A. L. Kitchin

INVENTOR
CLEMENT ENGEL
BY
ATTORNEYS

Patented Nov. 23, 1926.

1,608,378

UNITED STATES PATENT OFFICE.

CLEMENT ENGEL, OF NEW YORK, N. Y.

COMBINED SLED AND WAGON.

Application filed January 2, 1926. Serial No. 78,950.

This invention relates to a combined sled and wagon and has for an object to provide an improved construction wherein the device may be quickly changed to act as a wagon or a sled as desired by the owner.

Another object of the invention is to provide a combined wagon and sled wherein the sides of the structure extend upwardly from the center and rearwardly whereby a person may push the device easily without danger of tilting the rear end upwardly.

A further object of the invention is to provide a combined sled and wagon wherein the person using the device may walk or run between the sides at the rear and may at any time jump or step on a platform near the center and front.

In the accompanying drawing—

Figure 1:
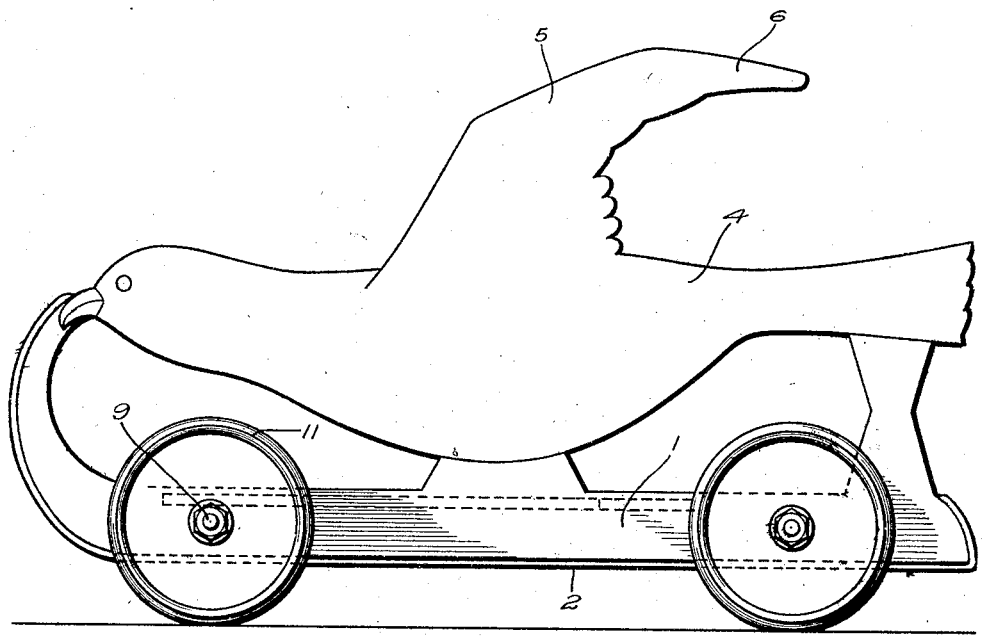
Figure 1 is a side view of a combined sled and wagon disclosing a preferred embodiment of the invention.
Figure 2:
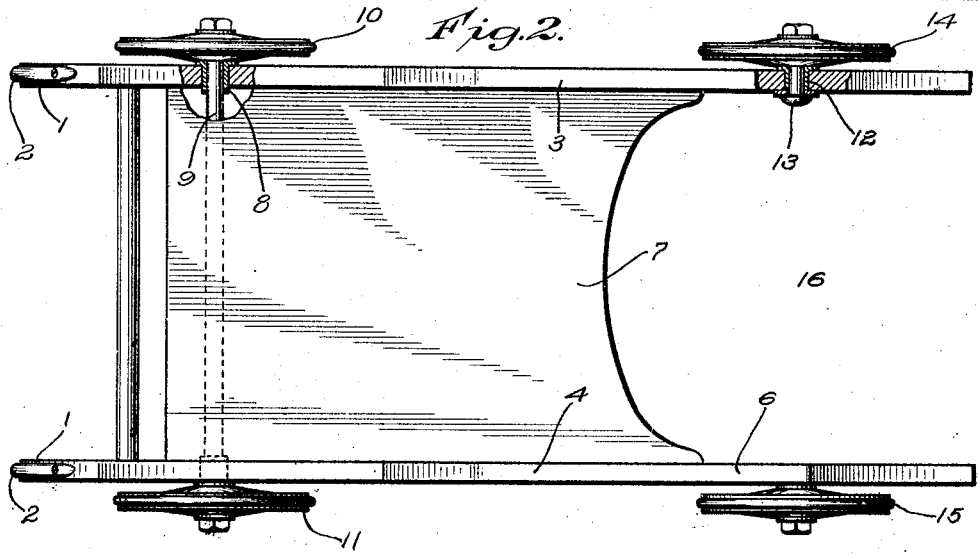
Figure 2 is a top plan view of the structure shown in Figure 1, certain parts being broken away for illustrating certain detail structures.

Referring to the accompanying drawing by numerals, 1 indicates the two runners which are provided with suitable steel members 2 and which are rigidly secured to or formed integral with the respective side members 3 and 4. The side members 3 and 4 are shaped to simulate a bird as shown in Figure 1 but some other configuration could be used without departing from the spirit of the invention. However, the side members are connected at the front and rear to the runners in any suitable manner and each side member is provided with an upwardly projecting section 5, said section having a rearwardly extending portion 6. The side members are so arranged in respect to the runners 1 that the center of the upwardly projecting portion 5 will be substantially central of the runners. In this way when any one pushes on the portion 6, the sled or wagon may be forced forwardly without danger of tilting the rear end. The runners 1 are connected together by a suitable platform 7, said platform being secured in place in any desired manner, as for instance, by nails or screws. At the front the respective runners 1 are provided with bearing sleeves 8 through which the axle 9 extends, said axle also extending through the respective front wheels 10 and 11. At the rear there are provided double flanged sleeves 12 for accommodating the stub shafts or rather stub axles 13, said stub axles carrying the respective rear wheels 14 and 15. The reason that the stub axles are used at the rear is in order to permit a person to stand or walk in the space 16 between the side members 3 and 4 and between the runners 1.

In the accompanying drawing the device is shown as being arranged to act as a wagon and an operator may stand, walk or run in the space 16 and push against the portion 6 whereupon the wagon may be propelled forwardly and also may be steered. The same action is true when the device is used as a sled and, of course, the various wheels are removed and the runner strips 2 are resting on the snow or other support.

What I claim is:

1. In a device of the character described, a pair of sled runners, a platform connecting said runners near the front part thereof, whereby a running space is presented between the runners at the rear portion thereof, and a pair of side members connected to said runners, each of said side members having an upwardly and rearwardly extending section adapted to act as a handle and be grasped by a person standing in said running space between the rear portion of the runners whereby the device may be propelled.

2. In a device of the character described, a sled structure, side members acting as a pair of handles when propelling the sled structure, said members being connected to the sled structure at the front, center and rear thereof, said members having portions extending to a point almost in line with the rear of the sled structure, and a body or supporting platform connected to the sled structure at the front part thereof.

CLEMENT ENGEL.